(12) United States Patent
Cornell

(10) Patent No.: US 8,730,264 B1
(45) Date of Patent: May 20, 2014

(54) DETERMINING WHEN IMAGE ELEMENTS INTERSECT

(75) Inventor: Brian Cornell, Kenmore, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/244,698

(22) Filed: Sep. 26, 2011

(51) Int. Cl.
G09G 5/00 (2006.01)

(52) U.S. Cl.
USPC ........... 345/629; 345/419; 345/586; 345/619; 345/645; 345/671; 715/213; 715/788; 715/790; 701/200; 701/208; 701/212; 701/213; 701/214; 701/206

(58) Field of Classification Search
USPC .......... 345/419, 586, 619, 645; 715/213, 788, 715/790; 701/200, 208, 212, 213, 214, 206
See application file for complete search history.

(56) References Cited

U.S. PATENT DOCUMENTS

| 4,694,404 A | 9/1987 | Meagher |
| 4,944,023 A | 7/1990 | Imao et al. |
| 5,345,490 A | 9/1994 | Finnigan et al. |
| 5,359,526 A | 10/1994 | Whittington et al. |
| 5,459,831 A | 10/1995 | Brewer et al. |
| 5,764,814 A | 6/1998 | Chen et al. |
| 5,781,195 A | 7/1998 | Marvin |
| 5,805,781 A | 9/1998 | McIntyre et al. |
| 5,848,373 A | 12/1998 | DeLorme et al. |
| 5,854,631 A | 12/1998 | Akeley et al. |
| 5,883,629 A | 3/1999 | Johnson |
| 5,977,988 A | 11/1999 | Greene |
| 6,075,467 A * | 6/2000 | Ninagawa ................. 340/995.14 |
| 6,137,493 A | 10/2000 | Kamimura et al. |
| 6,219,048 B1 | 4/2001 | Miller et al. |
| 6,259,826 B1 | 7/2001 | Pollard et al. |
| 6,295,055 B1 | 9/2001 | Miller et al. |
| 6,317,690 B1 | 11/2001 | Gia |
| 6,400,996 B1 | 6/2002 | Hoffberg et al. |
| 6,401,038 B2 | 6/2002 | Gia |
| 6,768,492 B2 | 7/2004 | Dorbie et al. |
| 6,867,772 B2 | 3/2005 | Kotcheff et al. |
| 6,950,828 B2 | 9/2005 | Shaw et al. |
| 7,016,536 B1 | 3/2006 | Ling et al. |
| 7,019,742 B2 | 3/2006 | Le Ouay |
| 7,031,517 B1 | 4/2006 | Le et al. |
| 7,043,694 B2 | 5/2006 | Miller et al. |
| 7,103,237 B2 | 9/2006 | Labelle |
| 7,123,271 B2 * | 10/2006 | Perry et al. .................... 345/611 |
| 7,130,467 B1 | 10/2006 | Bronder et al. |
| 7,194,134 B2 | 3/2007 | Bradshaw |
| 7,281,212 B2 | 10/2007 | Miller et al. |
| 7,549,122 B2 | 6/2009 | Miller et al. |
| 7,567,248 B1 | 7/2009 | Mark et al. |
| 7,576,754 B1 | 8/2009 | Joseph et al. |
| 7,595,725 B1 | 9/2009 | Joseph et al. |
| 7,872,648 B2 * | 1/2011 | Hoppe et al. ................... 345/423 |
| 7,904,486 B2 | 3/2011 | Crabtree |
| 7,961,965 B2 | 6/2011 | Moreira |
| 7,983,949 B1 | 7/2011 | Joseph et al. |
| 8,018,458 B2 | 9/2011 | Peterson |

(Continued)

Primary Examiner — Abderrahim Merouan
(74) Attorney, Agent, or Firm — Marshall, Gerstein & Borun LLP

(57) ABSTRACT

A plurality of graphics objects are assigned to a quad-tree structure corresponding to a display. It is determined whether another graphics object overlaps with a display area corresponding to a node of the quad-tree structure. When the other graphics object overlaps with the display area, it is determined whether the other graphics object intersects with any graphics objects belonging to the node.

17 Claims, 10 Drawing Sheets

(56) References Cited

U.S. PATENT DOCUMENTS

| | | |
|---|---|---|
| 2001/0023390 A1* | 9/2001 | Gia ............................... 701/301 |
| 2002/0027563 A1* | 3/2002 | Van Doan et al. ............ 345/630 |
| 2002/0054173 A1 | 5/2002 | Miller et al. |
| 2002/0190982 A1 | 12/2002 | Kotcheff et al. |
| 2004/0080525 A1 | 4/2004 | Miller et al. |
| 2005/0091223 A1 | 4/2005 | Shaw et al. |
| 2005/0102101 A1* | 5/2005 | Beesley et al. ................ 701/209 |
| 2005/0110789 A1 | 5/2005 | Le Ouay |
| 2005/0283503 A1* | 12/2005 | Hancock et al. .............. 707/200 |
| 2007/0019889 A1 | 1/2007 | Peter Miller et al. |
| 2010/0008565 A1 | 1/2010 | Chien |
| 2010/0198828 A1* | 8/2010 | Petersen et al. ............... 707/739 |
| 2011/0055290 A1* | 3/2011 | Li et al. ......................... 707/807 |
| 2011/0093458 A1* | 4/2011 | Zheng et al. .................. 707/724 |
| 2011/0286684 A1* | 11/2011 | Jin et al. ........................ 382/284 |

\* cited by examiner

DETERMINING WHEN IMAGE ELEMENTS INTERSECT

FIELD OF TECHNOLOGY

The present disclosure relates to image rendering systems, such as electronic map display systems, and more specifically to an image rendering system that detects when image elements intersect.

BACKGROUND

Digital maps are found in and may be displayed by a wide variety of devices, including mobile phones, car navigation systems, hand-held GPS units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are, of course, different manners of digitally rendering map images (referred to as digital map images) based on map data stored in a map database. One method of rendering a map image is to store map images within the map database as sets of raster or pixelated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific image objects or elements (also referred to as primitives) to be displayed as part of an image via an image display device. In the context of a map image, such image elements or primitives may be, for example, individual roads or road segments, text labels, areas, text boxes, buildings, points of interest markers, terrain features, bike paths, map or street labels, etc. Each image element is generally made up or drawn as a set of one or more triangles (of different sizes, shapes, colors, fill patterns, etc.), with each triangle including three vertices interconnected by lines. Thus, for any particular image element, the image database stores a set of vertex data points, with each vertex data point defining a particular vertex of one of the triangles making up the image element. Generally speaking, each vertex data point includes data pertaining to a two-dimensional or a three-dimensional position of the vertex (in an X, Y or an X, Y, Z coordinate system, for example) and various vertex attributes defining properties of the vertex, such as color properties, fill properties, line width properties for lines emanating from the vertex, etc.

During the image rendering process, the vertices defined for various image elements of an image to be rendered are provided to and are processed by a processor such as a graphics processing unit (GPU) to produce a two-dimensional image on a display screen.

The use of vector graphics can be particularly advantageous in a mobile map system in which image data is sent from a centralized map database via a communications network (such as the Internet, a wireless communications network, etc.) to one or more mobile or remote devices for display. In particular, vector data, once sent to the receiving device, may be more easily scaled and manipulated (e.g., rotated, etc.) than pixelated raster image data. However, the processing of vector data is typically much more time consuming and processor intensive on the image rendering system that receives the data. Moreover, using vector image data that provides a higher level of detail or information to be displayed in a map leads to a higher amount of vector data or vertices that need to be sent to the map rendering system from the map database that stores this information, which can result in higher bandwidth requirements or downloading time in some cases.

Moreover, in the case of both rasterized map images and vector data generated images, text, such as that used to label streets, roads and other features of a map, is generally stored as a predetermined image. Such images are hard to manipulate so as to vary the placement of the text. In a pixelated map image, for example, the text is located in a fixed position with respect to other map features and it is thus difficult if not impossible to change the orientation or placement of the text with respect to other image objects. When using vector data, text is typically stored as a fixed image or string that is not tied to other map features and thus can be placed at different locations within a map.

SUMMARY

In one embodiment, a computer-implemented method for generating a user interface includes assigning, using one or more processor devices, a plurality of graphics objects to a quad-tree structure corresponding to the display, and determining, using one or more processor devices, whether another graphics object overlaps with a display area corresponding to a node of the quad-tree structure. The method also may include when the other graphics object overlaps with the display area, determining, using one or more processor devices, whether the other graphics object intersects with any graphics objects belonging to the node. The graphics object may be a text block or a segment of a text block, in some embodiments.

In another embodiment, an apparatus may comprise one or more processor devices configured to assign a plurality of graphics objects to a quad-tree structure corresponding to a display, and determine whether another graphics object overlaps with a display area corresponding to a node of the quad-tree structure. Additionally, the one or more processor devices may be configured to determine, when the other graphics object overlaps with the display area, whether the other graphics object intersects with any graphics objects belonging to the node.

In another embodiment, a computer-readable memory is provided. The computer-readable memory stores instructions that, when executed by one or more processors, cause the one or more processors to assign a plurality of graphics objects to a quad-tree structure corresponding to a display, determine whether another graphics object overlaps with a display area corresponding to a node of the quad-tree structure, and, when the other graphics object overlaps with the display area, determine whether the other graphics object intersects with any graphics objects belonging to the node.

The features and advantages described in this summary and the following detailed description are not all-inclusive. Many additional features and advantages will be apparent to one of ordinary skill in the art in view of the drawings, specification, and claims hereof.

DETAILED DESCRIPTION

The present disclosure describes techniques for determining when a graphics object (e.g., a geometric primitive) intersects with any other graphics objects. The techniques may be implemented on a client device such as a computer, a mobile or handheld device, etc. When a graphics object is determined to intersect with one or more other graphics object, an appropriate action may be taken. For example, if it is determined that a text block in a map display overlaps with another text block in the map display, one of the text blocks may be omitted to avoid obscuring the other text block. In other embodiments, other suitable actions may be taken additionally or alternatively.

More particularly, the present disclosure describes techniques for categorizing graphics objects into a quad tree data structure corresponding to a display. For each graphics object, it is determined to which node of the quad tree structure the graphics object belongs. Then, it is determined whether the graphics object intersects with any other graphics belonging to the node. When a graphics object is determined to intersect with one or more other graphics object belonging to the node, an appropriate action may be taken.

Figure 1:
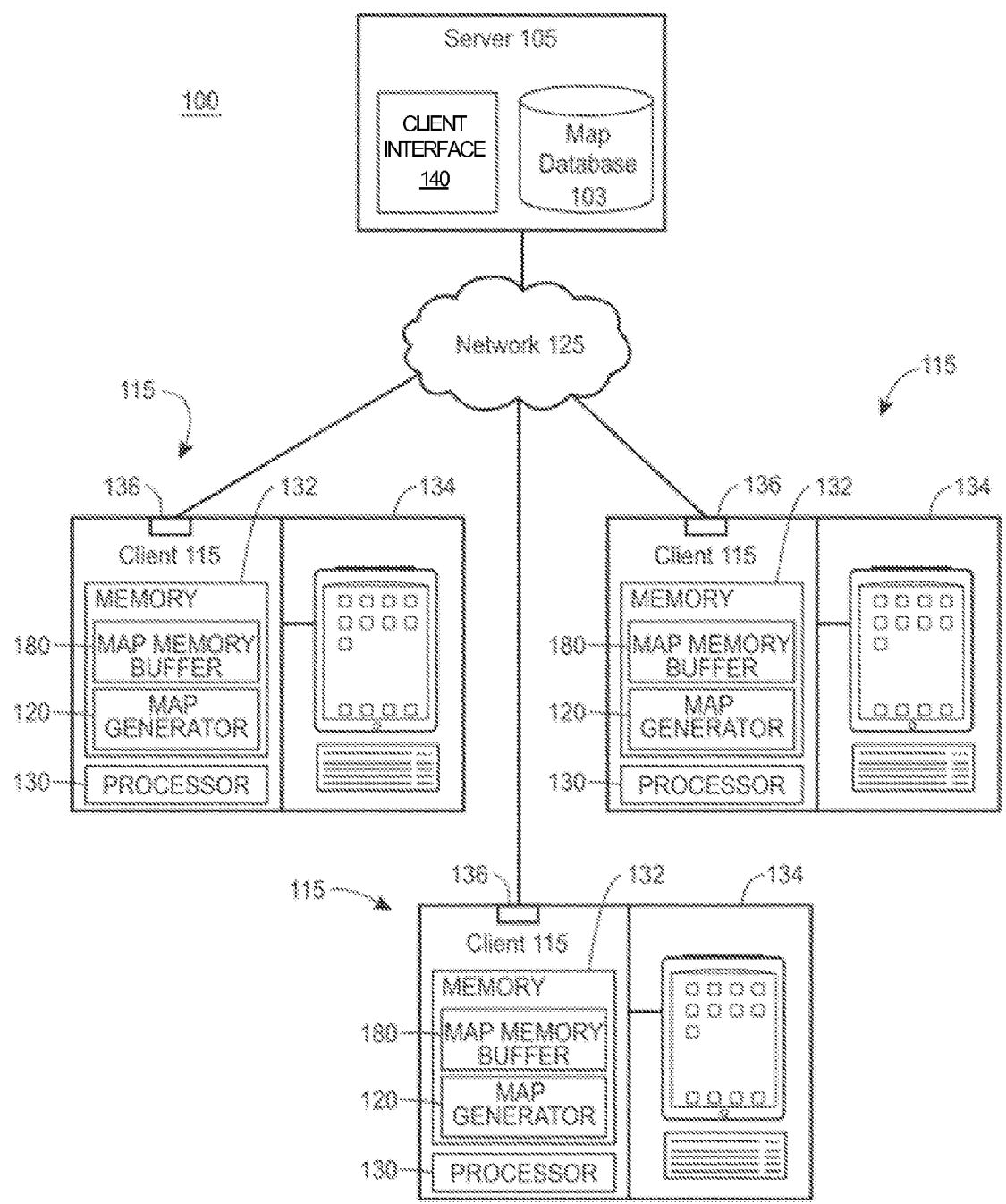
FIG. 1 is high-level block diagram for a communication network via which a mapping application receives vector graphics data and generates an image of a map, according to an embodiment.

FIG. 1 is a high-level block diagram that illustrates a computing environment for a map system 100 that may be used to access and store map data within a map database, according to an embodiment. As illustrated in FIG. 1, the computing environment includes a map database 103 connected to or disposed within a server 105, which is, in turn, communicatively connected to a number of client devices 115 through a network 125. The network 125 includes but is not limited to any combination of a local area network (LAN), a metropolitan area network (MAN), a wide area network (WAN), a mobile, a wired or wireless network, a private network, or a virtual private network. While only three clients 115 are illustrated in FIG. 1 to simplify and clarify the description, it is understood that any number of client computers are supported and can be in communication with the server 105.

Both the server 105 and the clients 115 are computers that may include one or more processors 130 (only shown in the clients), one or more computer readable memories 132, one or more user interfaces 134 (keyboard, touch screen, display device, etc.), a network interface 136, one or more peripheral interfaces, and other well known components. The one or more processors may include one or more of a central processing unit (CPU), a special purpose processor such as a graphics processing unit (GPU), etc. As is known to one skilled in the art, other suitable types of computers can be used that have different architectures. The client devices 115 represent any suitable computing device such as a desktop computer or a handheld and/or mobile device, such as a mobile phone, personal data assistant, laptop computer, tablet personal computer, car navigation system, hand-held GPS unit, or "smart" device. More broadly, the client devices 115 represent any personal computing device, database, server, or network of such devices, or any other processing device having a user interface and one or more processors and capable of displaying a visual rendition of map data accessed from the map database 103 or other remote source of map data. Furthermore, while in some examples, the network 125 is described as a wireless network, the network 125 may be any wired or wireless network, where the clients 115 are devices on the network.

The server 105 and the clients 115 are also adapted to execute computer program modules for providing functionality described herein. As used herein, the terms "module" and "routine" refer to computer program logic used to provide the specified functionality. Thus, a module or a routine can be implemented by a processor executing firmware instructions, and/or a processor executing software instructions. In one embodiment, program modules and routines are stored on a storage device, loaded into memory, and executed by a processor or can be provided from computer program products that are stored in tangible computer-readable memory (e.g. RAM, FLASH, hard disk, optical/magnetic media, etc.).

The map database 103, which may be stored in or may be separate from the server 105, contains map data that can be used to generate a digital map or that can be used by, for example, a navigation system to determine routes between two locations. Physical roads, waterways, parks, landmarks, and other geographic elements may be represented in the map data by graphics objects (e.g., geometric primitives). Some of the graphics objects correspond to specific geographic locations in the physical world. Each of these graphics objects may be associated with one or more sets of coordinates (e.g., latitude and longitude). A road may be represented by a plurality of graphics objects corresponding to physical segments of the road. The graphics object(s) corresponding to a road segment may be associated with attributes which may include, for example, a street name, a priority (e.g. a highway or a local road), speed information, a surface type, a road width, an indication of whether the road segment is a one-way segment, address ranges, usage (e.g. ramp or trail), etc.

Other types of graphics objects may not represent a physical object at a specific location in the physical world, but are informational. For example, some graphics objects may be text blocks that correspond to text to be displayed on the map display.

Each of at least some of the graphics objects may be associated with a rank. The rank may indicate an importance of display and/or an order in which the graphics objects (or a map feature to which the graphics object corresponds) should be displayed in relation to other graphics objects or map features. In one embodiment, each text block is associated with a rank. In another embodiment, each of some other graphics objects or map features is also associated with a rank. In another embodiment, each of all of the graphics objects or map features is associated with a rank.

The map data stored in the map database 103 can be obtained from several different sources such as the New York City Open Accessible Space Information System (OASIS) and the U.S. Census Bureau Topologically Integrated Geographic Encoding and Referencing system (TIGER). The map data can also be accessed by a map generator 120, modified, and stored back into the database 103. Further, the database 103 does not need to be physically located within server 105. For example, the database 103 can be partially stored within a client 115, can be stored in external storage attached to the server 105, or can be stored in a network attached storage. Additionally, there may be multiple servers 105 that connect to a single database 103. Likewise, the map database 103 may be stored in multiple different or separate physical data storage devices.

Each client 115 executes one of the map generators 120, each of which receives map data from the server 105 and generates a visual display of the received map data that is presented to the user on the display device 134. The map generator 120 is able to adjust that visual display in response to user interactions with the interface 134, for example, adjusting which map data is visualized at any given time in response to a user selecting to scroll (left, right, up, down, etc.) through the visual display, or in response to the user selecting to change the zoom level (e.g., scale) of the displayed map data.

The server 105 includes a client interface module 140 to receive client requests for map data and to transmit map data to the clients 115 in response to the requests.

Figure 2:
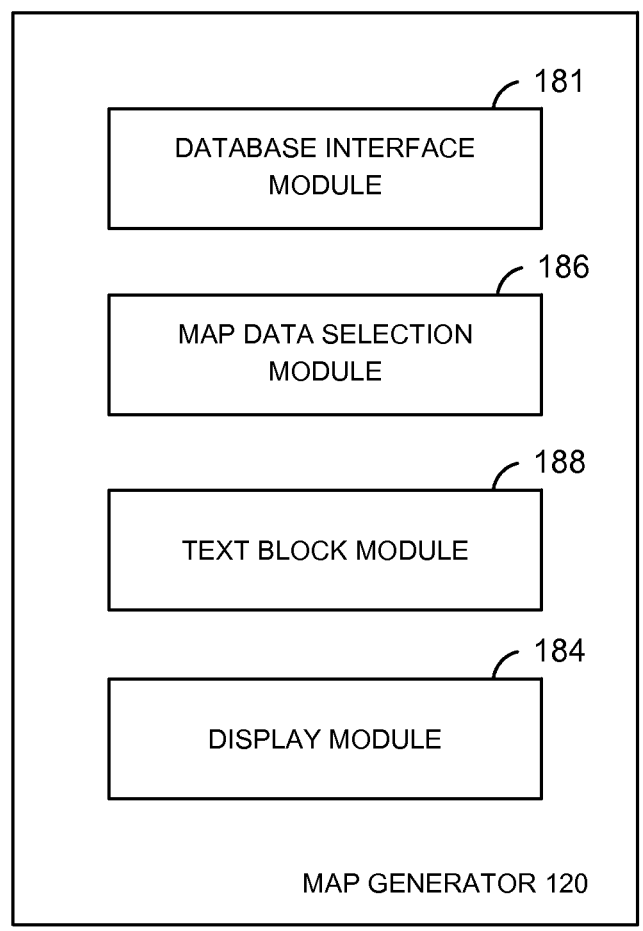
FIG. 2 is a block diagram of an example map generator in the client device of FIG. 1, according to an embodiment.

As illustrated in the detailed example of FIG. 2, the map generator 120 may include or be associated with various modules, including a database interface module 181 that operates to retrieve map data from the server 105 and map database 103. The interface module 181 transmits requests for map data through the network interface 136 and through network 125 to the server 105, which responds by sending map data from the map database 103 back to the client device 115, where this map data is received by the database interface module 181 and stored in a map buffer memory 180 of the client 115. A map data selection module 186 accesses the stored map data and determines which portion of that buffered map data is to be provided to the display module 184 for creating the visual map display on the display device 134. The map data selection module 186, therefore, is responsive to user interaction with the interface 134 to determine which portion of the map data the user desires to display on the client 115 at any given time, which desire is determined by a centralized map position, user scrolling, and zoom level, for example.

A text block module 188 analyzes text blocks in the received map data to determine whether any text blocks intersect with one or more other text blocks. In an embodiment, if a first text block intersects with a second text block, one of the first text block or the second text block may not be displayed in order to prevent the first and second text blocks from obscuring each other. In an embodiment, the text block module 188 analyzes bounding rectangles of text blocks (a bounding rectangle is a rectangle that encompasses all of or a portion of the text in a text block) in the received map data to determine whether any text blocks intersect with one or more other text blocks.

Of course, some embodiments of the map generator 120 may have different and/or other modules than the ones described herein. Similarly, the functions described herein can be distributed among the modules in accordance with other embodiments in a different manner than that described herein.

Figure 3:
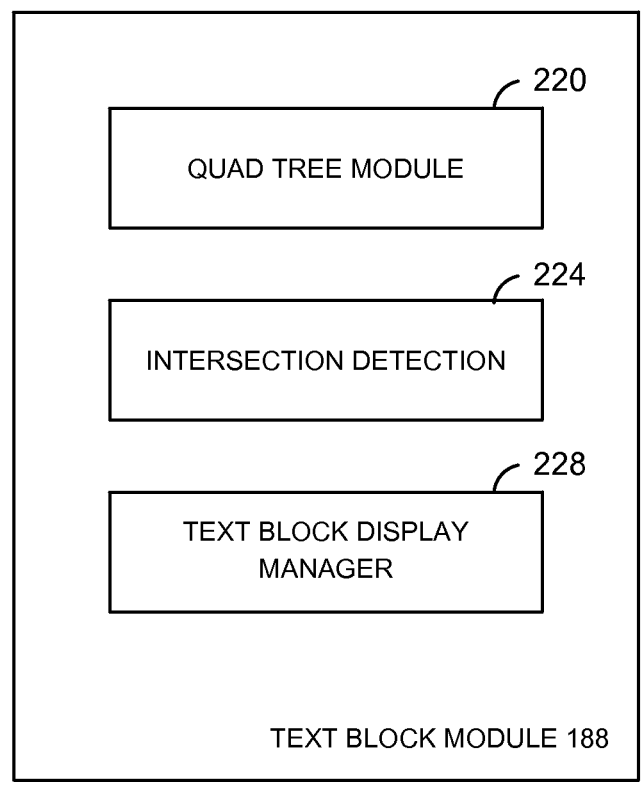
FIG. 3 is a block diagram of an example text block module in the map generator of FIG. 2, according to an embodiment.

FIG. 3 is a block diagram of the text block module 188, according to an embodiment. The text block module 188 includes a quad tree module 220, an intersection detection module 224, and a text block display manager 228.

The quad tree module 220 generally receives indications of text blocks to be displayed on a display, and categorizes the text blocks into a quad tree data structure corresponding to the display. For example, for each text block, it is determined to which node or nodes of the quad tree structure the text block belongs, and the text block is assigned to the node or nodes. For example, if a text block includes a plurality of segments (e.g., the text block is designed to follow a curved or angled feature on the map or the text block includes two lines of text), it may be determined, for each segment, to which node of the quad tree structure the segment belongs, and the segment is assigned to the node. If a text block is not segmented into a plurality of segments, the text block may be considered a single segment.

As will be discussed in more detail below, once a number of text block segments assigned to a node reaches a threshold, a plurality of child nodes are created. It may then be determined whether any of the text block segments assigned to the node should be reassigned to one of the child nodes.

The intersection detection module 224 determines whether a text block intersects with any other text blocks assigned to nodes in the quad tree structure (e.g., the text block would overlap with another text block when displayed on the display). When the intersection detection module 224 determines that a segment of a text block intersect with one or more other text block segments belonging to the node, the text block display manager 228 may decide that the text block should not be assigned to the quad tree structure. In an embodiment, when a text block is not assigned to a node of the quad tree structure, the text block will not be displayed. On the other hand, when the intersection detection module 224 determines that the text block does not intersect with any other text blocks, the text block display manager 228 may decide that the text block should be assigned to the quad tree structure.

In an embodiment, the intersection detection module 224 analyzes bounding rectangles of text blocks to determine whether a text block segment assigned to a node intersects with one or more other text block segments assigned to the node.

Figure 4:
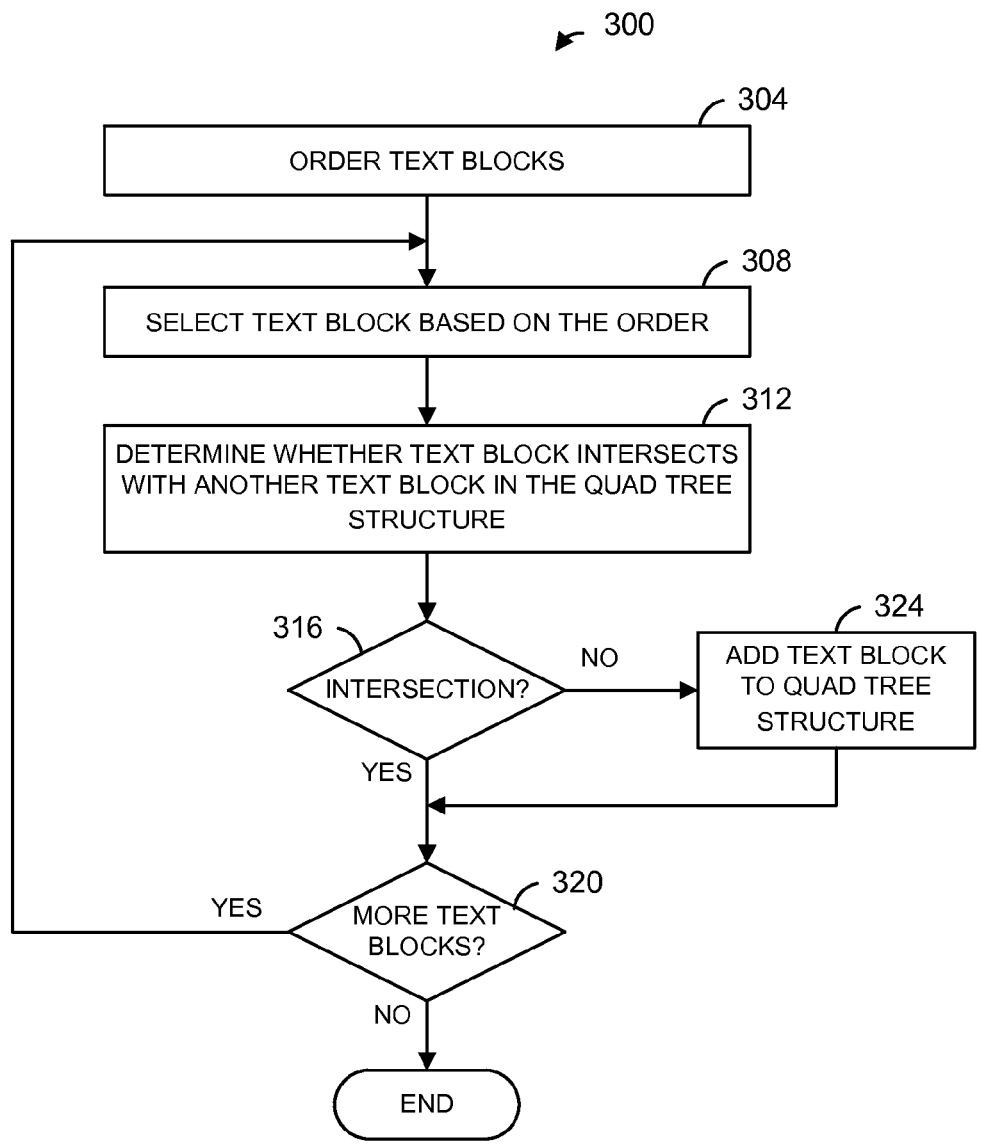
FIG. 4 is a flow diagram of an example method for determining whether text blocks should be omitted from a display and omitted from a quad tree structure, according to an embodiment.

FIG. 4 is a flow diagram of an example method 300 for determining whether a text block intersects with another text block in a quad tree structure and assigning text blocks to nodes of the quad tree structure, according to an embodiment. The method 300 may be implemented by the text block module 188, in an embodiment. In other embodiments, the method 300 may be implemented by another suitable module or modules.

At block 304, text blocks corresponding to a display are sorted into an ordered list. In an embodiment, the list sorts the text blocks into an order of importance, generally, corresponding to the rank assigned to each text block by the server 105 (e.g., to indicate an importance of display and/or an order in which the text blocks should be displayed in relation to other graphics objects or map features). Because some text blocks may have the same rank assigned by the server 105, additional information may be utilized to sort the text blocks. For example, in an embodiment, an ordering of the list is determined based on the rank assigned to each text block by the server and one or more of a sequence in which the text block was received from the server 105, coordinates of a map tile in which the text block was included, a zoom level of the map tile, etc. A map tile may be a set of vector graphics data corresponding to an area on a map. Additionally, a map tile may correspond to a zoom level, where lower zoom levels generally correspond to larger areas with less detail and higher zoom levels generally correspond to smaller areas with more detail, for example. In other embodiments, other suitable techniques for sorting the text blocks may be utilized. For example, if the server 105 does not rank text blocks, the order in which text blocks are received, and optionally other information, may be utilized to sort the text blocks into the ordered list.

At block 308, a text block is selected based on the ordering determined at block 304. For example, when initially performing the method 300, a text block corresponding to a highest importance is selected.

At block 312, a text block is selected based on the ordering determined at block 304. For example, when initially performing the method 300, a text block corresponding to a highest importance is selected. It is determined whether the selected text block intersects (e.g., overlaps) with another text block in the quad tree structure. Generally, a node of the quad tree structure corresponds to an area on the display. In an embodiment, the quad tree structure may initially consist of a single node, where the single node corresponds to the entire display. In another embodiment, the quad tree structure initially may additionally consist of four child nodes, where the four child nodes correspond respectively to four subareas of the display. As will be described below, the number of nodes in the quad tree structure may grow as more text blocks are added to the quad tree structure, in an embodiment.

Determining whether the selected text block intersects (e.g., overlaps) with another text block generally means determining whether the text block would intersect (e.g., overlap) the other text block on the display, if displayed, in an embodiment. Any suitable technique for determining whether a text block intersects with another text block may be utilized. Determining whether a text block intersects with another text block may include determining if one or more bounding rectangles of the text block intersect with one or more bounding rectangles of the other text block. An example technique for determining whether a text block intersects with another text block that may be utilized, in an embodiment, is described below.

If it is determined that the text block intersects with one or more other text blocks in the quad tree structure (block 316), the flow proceeds to block 320. At block 320, it is determined whether there are more text blocks to be analyzed. If there are more text blocks to be analyzed, the flow returns to block 308, at which another text block is selected. If it is determined that the text block does not intersect with other text blocks in the quad tree structure (block 316), the flow proceeds to block 324. At block 324, the selected text block is added to the quad tree structure. An example technique that may be utilized for adding a text block to the quad tree, in an embodiment, is described below.

As can be seen, a text block that is found to intersect with another text block in the quad tree structure is omitted from the quad tree structure. In an embodiment, text blocks omitted from the quad tree structure are not subsequently displayed on the display. For example, in an embodiment, only text blocks assigned to nodes of the quad tree structure may be displayed. Thus, if a text block is omitted from the quad tree structure it will not be subsequently displayed.

The method 300 may be performed each time the display is to be refreshed (e.g., at a rate of 60 Hz or another suitable refresh rate), according to an embodiment. In this embodiment, all of the method blocks of the method 300 need not be implemented each time the method 300 is performed. For example, block 304 may be performed once, and may not need to be performed again until the display somehow changes.

In another embodiment, the method 300 need not performed each time the display is to be refreshed. Rather, in an embodiment, the method 300 is performed when a new display is to be displayed, or when an existing display is somehow modified (e.g., a pan action, a rotate action, etc., from a user, new information is to be added to an existing display, etc.).

Figure 5:
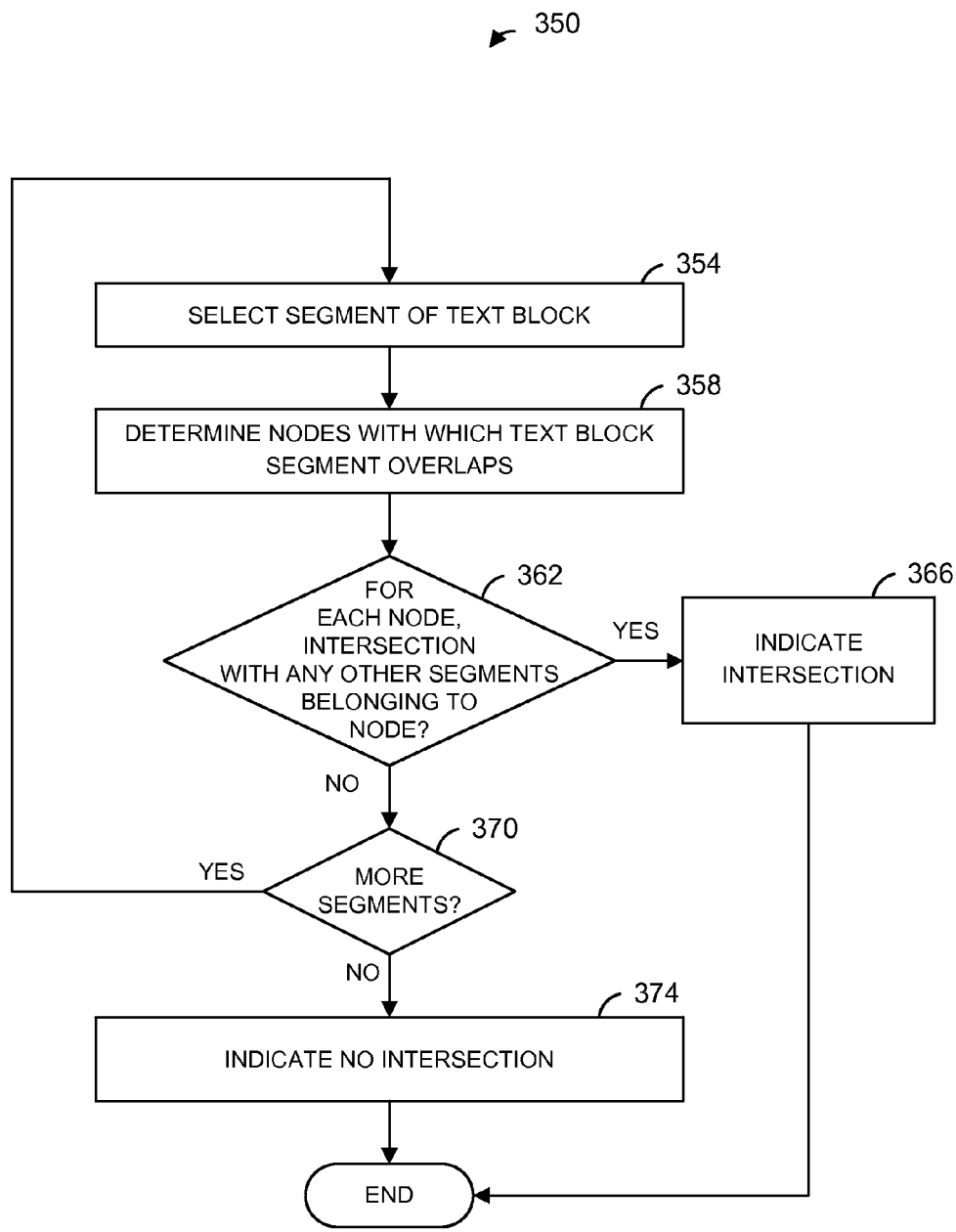
FIG. 5 is a flow diagram of an example method for determining whether a text block intersects with one or more other text blocks assigned to a quad tree structure, according to an embodiment.

FIG. 5 is a flow diagram of an example method 350 for determining whether a text block intersects with another text block in a quad tree structure. The method 350 may be implemented by the text block module 188 (e.g., by the intersection detection module 224) in an embodiment. In other embodiments, the method 350 may be implemented by another suitable module or modules.

At block 354, a segment of the text block may be selected, in an embodiment. As discussed above, in some embodiments, a text block may include a plurality of segments. For example, if a text block is designed to follow a curved or angled feature on the map, different segments of the text block may be angled differently to follow a contour of the feature. As another example, in some embodiments or scenarios, if a text block includes two lines of text, each line may compose a separate segment (in other embodiments or scenarios, however, a multi-line text block includes only a single segment). When a text block comprises only a single segment, the single segment is selected at block 354.

At block 358, the node or nodes of the quad tree structure with which the segment overlaps may be determined. As discussed above, a node of the quad tree structure generally corresponds to an area on the display. In an embodiment, the quad tree structure may initially consist of a single node, where the single node corresponds to the entire display. Thus, every text block segment may overlap with such a single node. When the quad tree structure additionally consists of four child nodes, where the four child nodes correspond respectively to four subareas of the display, block 358 may additionally comprise determining with which of the child nodes the segment overlaps.

Figure 6:
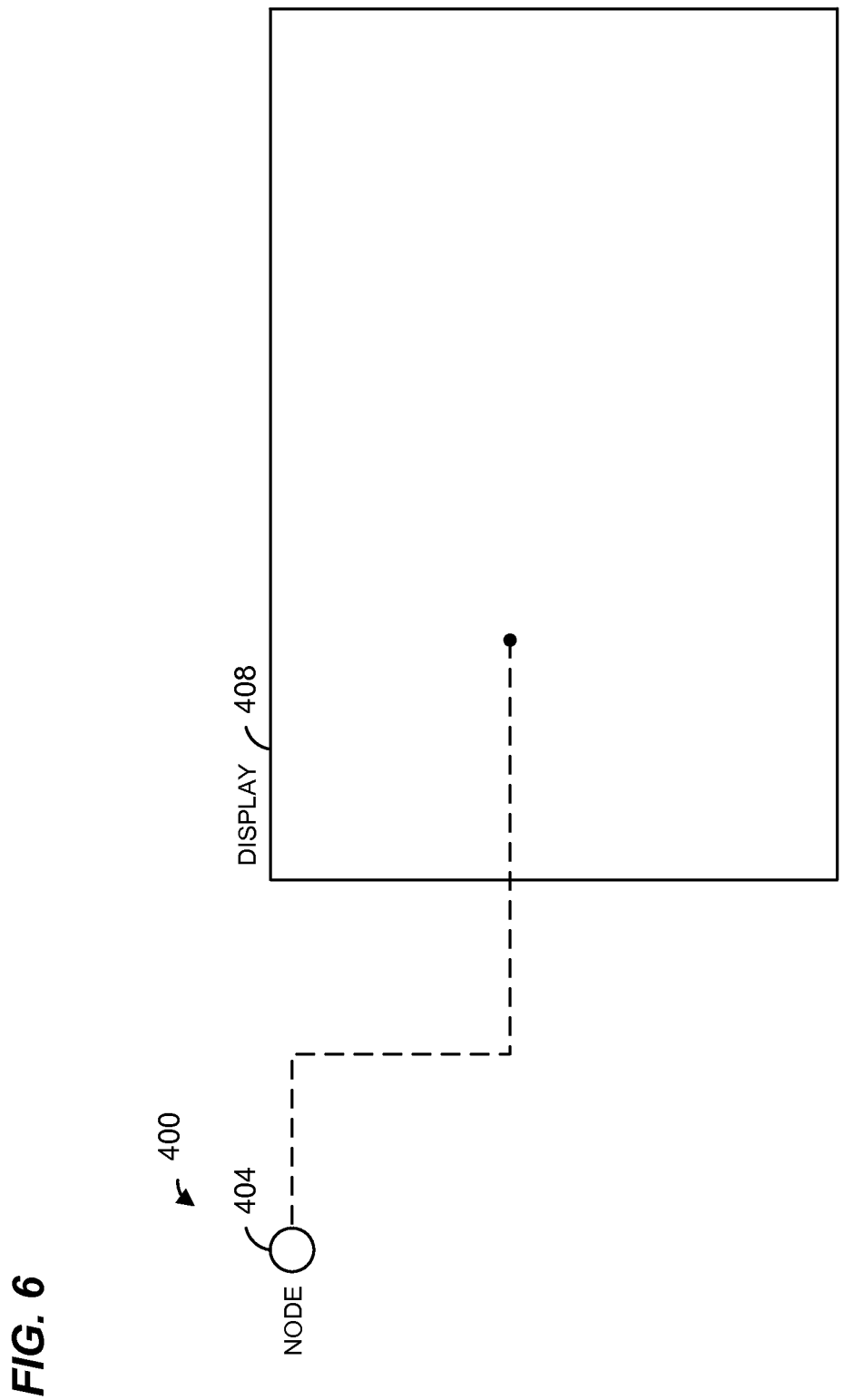
FIG. 6 is a diagram of an example quad tree structure with a single node that corresponds to a display area, according to an embodiment.
Figure 7:
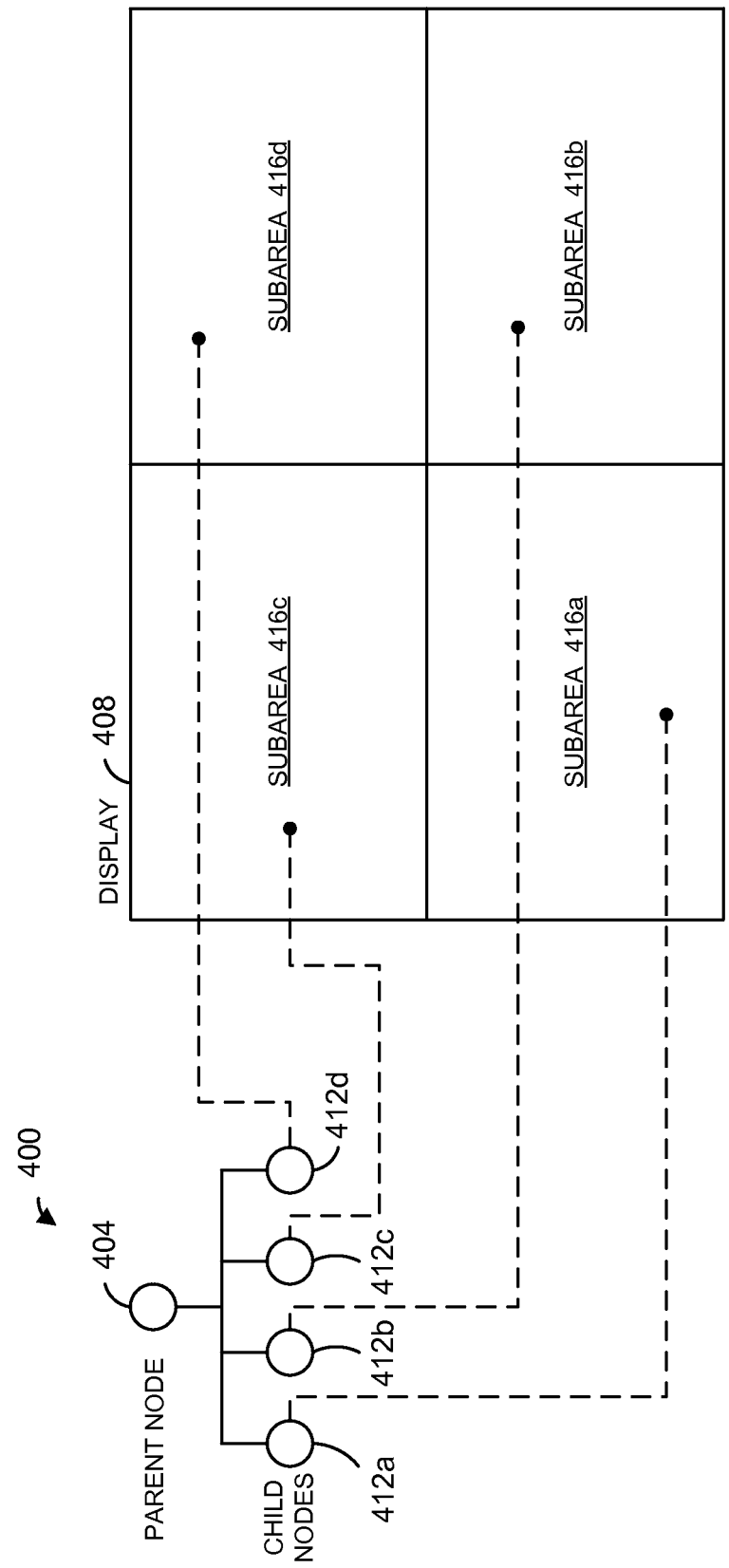
FIG. 7 is a diagram of an example quad tree structure with multiple nodes that correspond to different subareas of the display area of FIG. 6, according to an embodiment.

FIG. 6 is a diagram illustrating an example quad tree structure 400 consisting of a single node 404, where the node 404 corresponds to a display 408, as indicated by the dashed line. FIG. 7 is a diagram of the quad tree structure 400, where the quad tree structure 400 additionally consists of four child nodes 412. Each node 412 corresponds to a respective subarea 416 of the display, as indicated by the dashed lines. In an embodiment, the subareas 416 may be of equal size. In other embodiments, the subareas 416 may have two or more different sizes.

Figure 8:
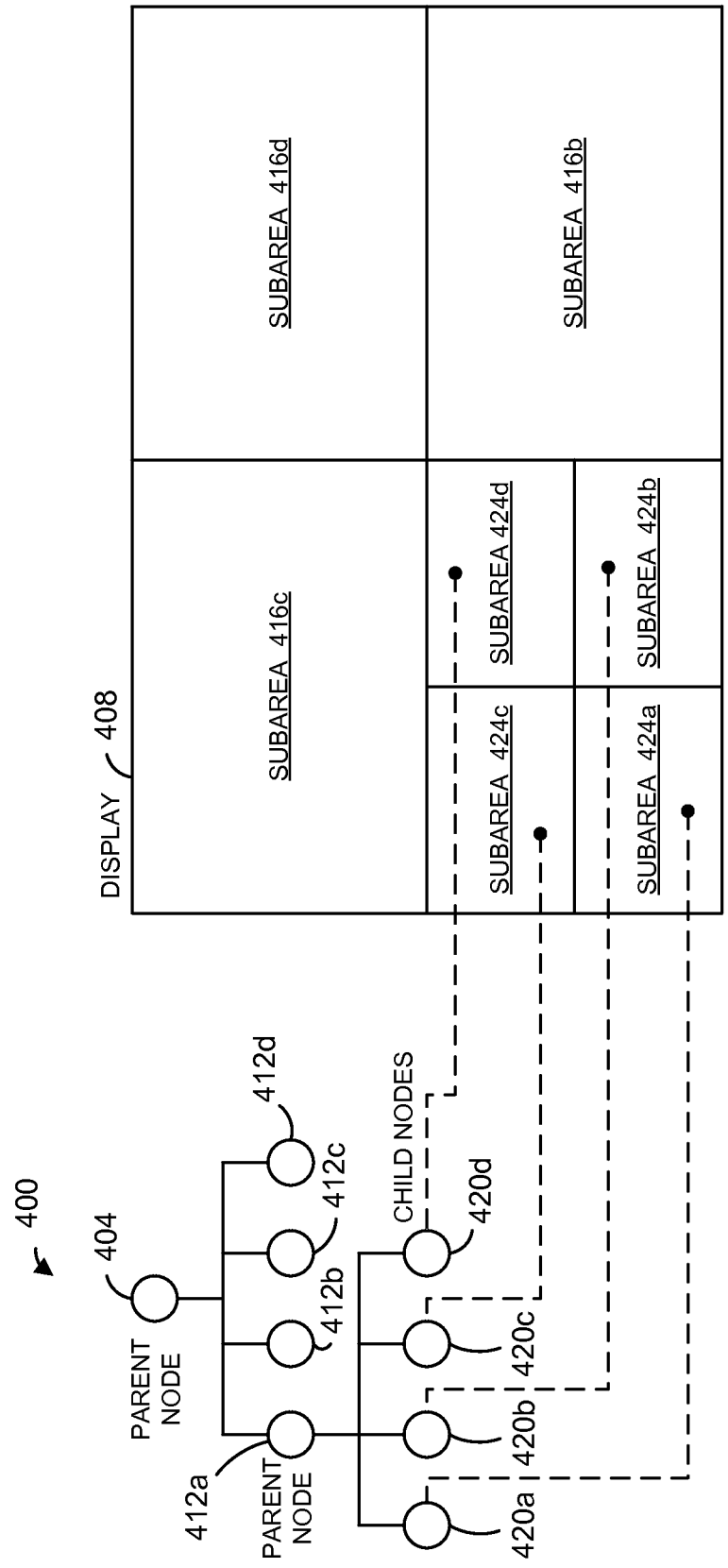
FIG. 8 is a diagram of an example quad tree structure with multiple nodes that correspond to different subareas of the display area of FIGS. 5 and 6, according to an embodiment.

FIG. 8 is a diagram of the quad tree structure 400 discussed with reference to FIGS. 6 and 7, where the quad tree structure 400 additionally consists of four child nodes 420, which are children of node 412*a*. The quad tree structure 400 illustrated in FIG. 8 has three levels: a first level corresponding to node 404, a second level corresponding to nodes 412, and a third level corresponding to nodes 420. Node 412*a* is a parent with respect to nodes 420, and node 412*a* is a child with respect to node 404. Similarly node 404 is a parent with respect to nodes 412 and 420. Nodes 420 are children with respect to node 404. Each node 420 corresponds to a respective subarea 424 of the display, as indicated by the dashed lines. In an embodiment, the subareas 424 may be of equal size. In other embodiments, the subareas 424 may have two or more different sizes.

Determining whether a text block overlaps with a node may include determining whether any portion of one or more bounding rectangles corresponding to the text block are included in the display area or subarea corresponding to the node, in an embodiment. For example, for a text block having text that is displayed in a straight line, a single bounding rectangle that encompasses all of the text in the text block may be analyzed to determine whether any portion of the bounding rectangle is included in the display area or subarea corresponding to the node. As another example, if a text block has a first text portion that is displayed in a first straight line and a second portion that is displayed in a second straight line that is at an angle to the first straight line and/or parallel to the first straight line (e.g., the text block is designed to follow a curved or angled feature on the map or the text block includes two lines of text), a first rectangle and a second rectangle that encompass the first text portion and the second text portion, respectively, may be analyzed to determine whether any portion of the first bounding rectangle or the second bounding rectangle is included in the display area or subarea corresponding to the node.

In an embodiment, if the quad tree structure consists of only a single node, a text block may be automatically determined to overlap with the node without explicitly determining whether any portion of the one or more bounding rectangles corresponding to the text block is included entirely in the display area corresponding to the single node.

Referring again to FIG. 5, determining the node or nodes with which a segment overlaps may begin with the highest level node or nodes of the quad tree structure and then work downward in levels. For example, in an embodiment, when a segment is determined to overlap with a node, it may be determined whether the node has children. If the node has children, it may be determined whether the text block segment overlaps with any of the child nodes. For each child node with which the segment overlaps, it may be determined if the node has children, and, if so, whether the text block segment overlaps with any of the child nodes, and so on.

As an illustrative example, say a text block segment spans subareas 424*b*, 424*d*, and 416*b* (FIG. 8). Block 358 may begin with node 404. Since node 404 has children (nodes 412), it may be determined whether the segment intersects any of nodes 412 (i.e., whether the segment overlaps with any of areas 416). In the illustrative example, it will be determined that the segment intersects nodes 412*a* and 412*b*. Since node 412*a* has children (nodes 420), it will then be determined whether the segment intersects with any of nodes 420 (i.e., whether the segment overlaps with any of areas 424). It will then be determined that the segment intersects nodes 420*b* and 420*d*. Since nodes 420*b* and 420*d* do not have children, the process may end.

Any suitable technique for determining whether a text block segment intersects (i.e., overlaps) with a node may be utilized. Determining whether a text block intersects with a node may include determining if one or more bounding rectangles of the text block intersect or overlap with a display area corresponding to the node.

At block 362, for each node with which the segments overlaps, it may be determined whether the segment intersects with any text block segments already assigned to the node. Any suitable technique for determining whether a text block segment intersects with another text block segment may be utilized. Determining whether a text block segment intersects with another text block segment may include determining if one or more bounding rectangles of the text block segment intersect with one or more bounding rectangles of the other text block segment. An example technique that may be utilized, in an embodiment, for determining whether a text block segment intersects with another text block segment is described below.

In an embodiment, block 362 may generally start with nodes in a lowest level of the quad tree structure, and then proceed to higher levels. Continuing with the illustrative example of above, and referring to FIGS. 5 and 8, after determining that node 420*b*, for example, does not have children, it may be determined whether the text block segment intersects with any segments already assigned to node 420*b*. If the segment intersects with a segment assigned to node 420*b*, the flow may proceed to block 366. On the other hand, if the segment does not intersect with a segment assigned to node 420*b*, it may be determined whether the segment intersects with any segments already assigned to node 420*d*. If the segment intersects with a segment assigned to node 420*d*, the flow may proceed to block 366. On the other hand, if the segment does not intersect with a segment assigned to node 420*d*, it may be determined whether the segment intersects with any segments already assigned to node 412*a*. If the segment intersects with a segment assigned to node 412*a*, the flow may proceed to block 366. On the other hand, if the segment does not intersect with a segment assigned to node 412*a*, it may be determined whether the segment intersects with any segments already assigned to node 412*b*. If the segment intersects with a segment assigned to node 412*b*, the flow may proceed to block 366. On the other hand, if the segment does not intersect with a segment assigned to node 412*b*, it may be determined whether the segment intersects with any segments already assigned to node 404. If the segment intersects with a segment assigned to node 404, the flow may proceed to block 366. On the other hand, if the segment does not intersect with a segment assigned to node 404, the flow may proceed to block 370.

In another embodiment, block 362 may generally start with the node or nodes in the highest level of the quad tree structure, and then proceed to lower levels. For example, it first may be determined whether the segment overlaps with any segments already assigned to node 404. If the segment intersects with a segment assigned to node 404, the flow may proceed to block 366. On the other hand, if the segment does not intersect with a segment assigned to node 404, it may be determined whether the segment intersects with any segments already assigned to node 412*a*, and so on.

As discussed above, when it is determined at block 362 that the segment overlaps with another segment, the flow may proceed to block 366. At block 366, it may be indicated that the segment overlaps with another segment already assigned to the quad tree structure, and the flow may end.

On the other hand, when it is determined at block 362 that the segment does not overlap with another segment, the flow may proceed to block 370. At block 370, it may be determined whether there are other segments of the text block to be analyzed. If it is determined that there are more segments to be analyzed, the flow may return to block 354 to select a next segment of the text block. On the other hand, if it is determined at block 370 that there are not more segments to be analyzed, the flow may proceed to block 374. At block 374, it may be indicated that the text block does not intersect with any other text blocks already assigned to the quad tree structure, and the flow may end.

Figure 9:
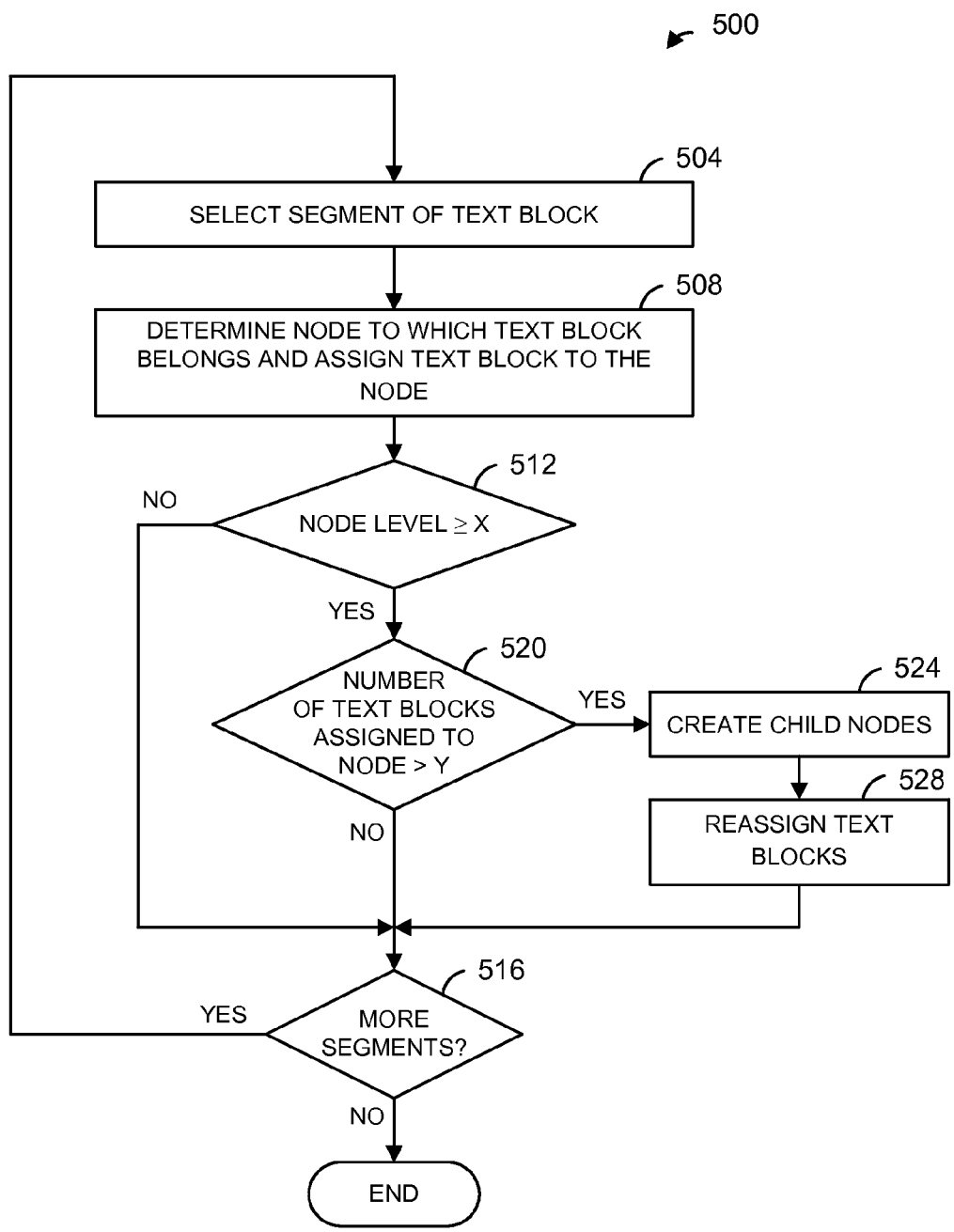
FIG. 9 is a flow diagram of an example method for adding a text block to a quad tree structure, according to an embodiment.

Referring again to FIG. 4, and as discussed above, when it is determined at block 316 that the text block does not intersect with another text block already assigned to the quad tree structure, the text block may be assigned to the quad tree structure at block 324. FIG. 9 is a flow diagram of an example method 500 for adding a text block to a quad tree structure. The method 500 may be implemented by the text block module 188 (e.g., by the quad tree module 220) in an embodiment. In other embodiments, the method 500 may be implemented by another suitable module or modules.

At block 504, a segment of the text block may be selected, in an embodiment. When a text block comprises only a single segment, the single segment is selected at block 354.

At block 508, it is determined to which node of a quad tree structure the selected text block segment belongs and the text block segment is assigned to the determined node. Determining whether a text block segment belongs to a node may include determining whether one or more bounding rectangles corresponding to the text block segment are included entirely in the display area or subarea corresponding to the node, in an embodiment. For example, a single bounding rectangle that encompasses all of the text in the text block segment may be analyzed to determine whether the bounding rectangle is included entirely in the display area or subarea corresponding to the node.

In an embodiment, if the quad tree structure consists of only a single node, a text block may be automatically assigned to the node without explicitly determining whether one or more bounding rectangles corresponding to the text block are included entirely in the display area corresponding to the node.

In another embodiment, block 508 includes analyzing the text block segment with regard to child nodes in the quad tree structure until it is determined that the text block segment belongs to one of the child nodes or if it is determined that text block segment does not belong to any of the child nodes. In an embodiment, block 508 includes analyzing the text block segment with regard to at least each child node in the quad tree structure. For example, if the quad tree structure has the form of FIG. 7, block 508 may include analyzing the text block segment with regard to all of the nodes 412.

In an embodiment, analyzing the text block segment with regard to nodes of the quad tree structure may start with a node or nodes in a highest level of the quad tree structure, and then conditionally proceed to the next lowest level as will be discussed below. The quad tree structure 400 illustrated in FIG. 8 has three levels: a first level corresponding to node 404, a second level corresponding to nodes 412, and a third level corresponding to nodes 420. Node 412a is a parent with respect to nodes 420, and node 412a is a child with respect to node 404. Similarly node 404 is a parent with respect to nodes 412 and 420. Nodes 420 are children with respect to node 404. Each node 420 corresponds to a respective subarea 424 of the display, as indicated by the dashed lines. In an embodiment, the subareas 424 may be of equal size. In other embodiments, the subareas 424 may have two or more different sizes.

As an illustrative example, and referring now to FIGS. 8 and 9, analyzing the text block segment with regard to nodes of the quad tree structure may start with node 404. It may then be determined whether the text block segment belongs to any of nodes 412. If it is determined that the text block does not belong to any of the nodes 412, it may be determined that the segment is assigned to node 404. On the other hand, if it is determined that the text block segment belongs to node 412a, for example, the text block segment may be analyzed with regard to nodes 420. If it is determined that the text block does not belong to any of the nodes 420, it may be determined that the node is assigned to node 412a, for example. On the other hand, if it is determined that the text block segment belongs to node 420b, for example, and node 420b does not have children nodes, the text block segment may be assigned to node 420b. In other embodiments, analyzing the text block with regard to nodes of the quad tree structure may proceed in another suitable manner.

In another embodiment, a text block segment may be determined to belong to a node if any portion of the text block would fall within the display area or subarea corresponding to the node. In this embodiment, a text block may be determined to belong to multiple nodes.

At block 512, it is determined whether the level of the node to which the text block segment was assigned at block 508 meets a threshold X, where X is a positive integer or some other suitable indicator of a maximum node level or threshold node level. For example, it may be determined if the level is greater than or equal to X. For example, in an embodiment, nodes may be assigned indexes that indicate a degree of removal from the initial node 404. For example, referring to FIGS. 6-8, node 404 may be assigned a level of one, nodes 412 may be assigned a level of two, and nodes 420 may be assigned a level of three. If the threshold X is three, for example, and if the text block was assigned to one of the nodes 420, it may be determined that the level of the node meets the threshold X. Similarly, if the text block was assigned to one of the nodes 404 and 412, it may be determined that the level of the node does not meet the threshold X.

If it is determined at block 512 that the threshold X is met, the flow may proceed to block 516. At block 512, it may be determined whether there are other segments of the text block to be assigned to the quad tree structure. If it is determined that there are more segments to be assigned, the flow may return to block 504 to select a next segment of the text block. On the other hand, if it is determined at block 516 that there are not more segments to be assigned, the flow may end.

On the other hand, if it is determined at block 512 that the threshold X is not met, the flow may proceed to block 520. At block 520, it may be determined whether the number of text block segments assigned to the node meets a threshold Y, where Y is a positive integer. For example, it may be determined if the number of text block segments is greater than Y. If it is determined at block 520 that the threshold Y is not exceeded, the flow may proceed to block 516.

On the other hand, if it is determined at block 520 that the threshold Y is met, the flow may proceed to block 524. At block 524, a plurality of child nodes (e.g., four child nodes or another suitable number) are created from the node assigned at block 508 (i.e., the created nodes are children of the node assigned at block 508). At block 528, each text block segment assigned to the node is evaluated to determine if the text block segment should be reassigned to one of the child nodes created at block 524. Determining whether a text block segment belongs to a node may include techniques discussed above with respect to block 508. After block 528, the flow may proceed to block 516.

In other embodiments, the method 300 (FIG. 4), the method 350 (FIG. 5), and/or the method 500 (FIG. 9) may be modified in various ways, such as omitting some method blocks, adding further method blocks, changing the order of method blocks, combining method blocks, splitting a method block into several method blocks, etc. For example, in an embodiment, the block 512 may be omitted.

Figure 10:
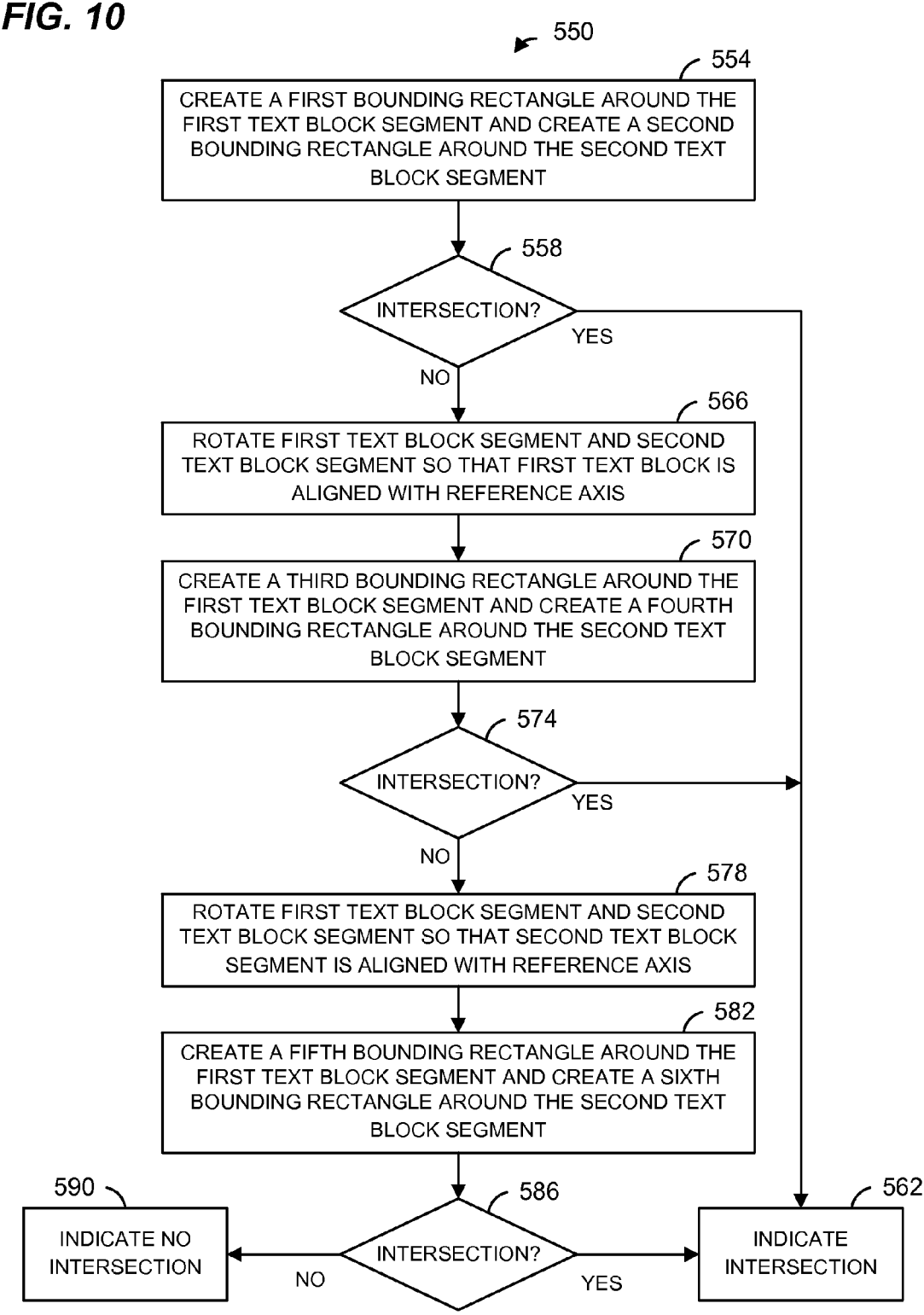
FIG. 10 is a flow diagram of an example method for determining whether a text block segment intersects with another text block segment, according to an embodiment.

FIG. 10 is a flow diagram of an example method 550 for determining whether a first text block segment intersects with a second text block segment. The method may be utilized at block 362 of FIG. 5, in an embodiment. For example, the method 550 may be utilized at block 362 one or more times to determine if a text block segment intersects with each of one or more other text block segments. The method 550 may be implemented by the intersection detection module 224 of FIG. 3, in an embodiment.

At block 554, a first bounding rectangle is created around the first text block and a second bounding rectangle is created around the second text block. The bounding rectangles created at block 554 may be aligned with a reference axis, whereas the first text block and the second text block need not be aligned with the reference axis.

At block 558, it is determined whether the first bounding rectangle intersects with the second bounding rectangle. If an intersection is detected at block 558, the flow proceeds to block 562, at which an indication of an intersection between the first text block and the second text block is generated. On the other hand, if an intersection is not detected at block 558, the flow proceeds to block 566.

At block 566, a transform is performed on the first text block and the second text block to rotate the first text block and the second text block so that the first text block is aligned with the reference axis. At block 570, a third bounding rectangle is created around the first text block and a fourth bounding rectangle is created around the second text block. The bounding rectangles created at block 570 may be aligned with a reference axis. Additionally, unlike the block 554, the first text block is also necessarily aligned with the reference axis. Similar to the block 554, the second text block need not be aligned with the reference axis.

At block 574, it is determined whether the third bounding rectangle intersects with the fourth bounding rectangle. If an intersection is detected at block 574, the flow proceeds to block 562, at which an indication of an intersection between the first text block and the second text block is generated. On the other hand, if an intersection is not detected at block 574, the flow proceeds to block 578.

At block 578, a transform is performed on the first text block and the second text block to rotate the first text block and the second text block so that the second text block is aligned with the reference axis. At block 582, a fifth bounding rectangle is created around the first text block and a sixth bounding rectangle is created around the second text block. The bounding rectangles created at block 582 may be aligned with a reference axis. Additionally, unlike the block 554 and the block 566, the second text block is also necessarily aligned with the reference axis. Similar to the block 554 but unlike the block 566, the first text block need not be aligned with the reference axis.

At block 586, it is determined whether the fifth bounding rectangle intersects with the sixth bounding rectangle. If an intersection is detected at block 586, the flow proceeds to block 562, at which an indication of an intersection between the first text block and the second text block is generated. On the other hand, if an intersection is not detected at block 586, the flow proceeds to block 590 at which an indication of no intersection between the first text block and the second text block is generated.

In some embodiments, results of at least some intermediate calculations related to the rotations in method blocks 566 and 578 may be stored for future use so that the at least some intermediate calculations do not have to be repeated. For example, when further determinations of whether the first text block intersects with other further text blocks may need to be performed, results of intermediate calculations related to the rotation of the first text block in method block 566 may be stored for future use so that the intermediate calculations do not have to be repeated in further implementations of the method 550 with respect to the first text block and other further text blocks. Similarly, for example, when further determinations of whether the second text block intersects with other further text blocks may need to be performed, results of intermediate calculations related to the rotation of the second text block in method block 578 may be stored for future use so that the intermediate calculations do not have to be repeated in further implementations of the method 550 with respect to the second text block and other further text blocks.

In other embodiments, the method 550 may be modified in various ways, such as omitting some method blocks, adding further method blocks, changing the order of method blocks, combining method blocks, splitting a method block into several method blocks, etc.

In an embodiment, the methods 300, 350, 500 and 550 are implemented at least partially using machine readable instructions executed by a processor. For example, in an embodiment, the methods 300, 350, 500 and 550 are implemented using a script that is executed by use of an interpreter. In an embodiment, the methods 300, 350, 500 and 550 are implemented in a web browser environment.

In other embodiments, techniques such as described above may be utilized to detect whether a graphics object (which need not be a text block or text block segment) intersects with any other graphics objects (which need not be text blocks or text block segments) corresponding to a display. In other embodiments, techniques such as described above may be utilized to detect whether a point of interest intersects with any graphics objects (which need not be text blocks or text block segments) corresponding to a display. For example, the point of interest may be a point or area at which a touch is detected on a touch screen or a point corresponding to a mouse click. Additionally, the action taken when an intersection is detected need not be omitting one of the intersecting graphics objects from the display. For example, in another embodiment, the action taken may include moving one of the graphics objects so that the two graphics objects do not overlap. This may be useful, for example, in an video game to detect when one graphics representation of a physical object has collided with a graphics representation of another physical object and to prevent the one physical object from appearing to "go through" another physical object (e.g., prevent a character from walking through a wall). As another example, in another embodiment in which the intersection detection is utilized for detecting whether a touch screen press or mouse click intersected with a graphics object, the action taken may include responding as if the user selected the graphics object. This may be useful, for example, detecting whether a user has selected a graphical user interface mechanism (e.g., a button, a menu item), whether the user selected a point of interest on a map, etc.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 125 may include but is not limited to any combination of a LAN, a MAN, a WAN, a mobile, a wired or wireless network, a private network, or a virtual private network. Moreover, while only three clients 115 are illustrated in FIG. 1 to simplify and clarify the description, it is understood that any number of client computers are supported and can be in communication with the server 105.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for determining whether a first graphics object to be displayed on a display device will visually intersect with any of a plurality of second graphics objects to be displayed on a display device, the method comprising:

assigning, using one or more processor devices, the plurality of second graphics objects to a quad-tree structure corresponding to a view area of the display device, wherein the quad-tree structure includes a plurality of nodes, wherein at least some of the nodes correspond to respective sub-areas within the view area of the display device;

determining, using one or more processor devices, with which of the sub-areas of the display device the first graphics object will visually overlap when the first graphics object is displayed on the display device;

for each of the sub-areas of the display device with which it is determined the second graphics object will visually overlap, determining, using one or more processor devices, whether the first graphics object will visually intersect with any second graphics objects belonging to the corresponding node when the first graphics object and the plurality of second graphics objects are displayed on the display device;

when it is determined that the first graphics object will not visually intersect with any of the second graphics objects assigned to the quad tree structure:
  determining, using one or more processor devices, a node of the quad tree structure to which the first graphics object belongs, and
  assigning the first graphics object to the determined node;

when it is determined that the first graphics object will visually intersect with at least one of the second graphics objects assigned to the quad tree structure, either:
  (i) omitting the first graphics object from the quad tree structure so that the first graphics object will not be displayed on the display device, or
  (ii) moving a location of the first graphics object so that the first graphics object will not visually intersect with the at least one of the second graphics objects assigned to the quad tree structure when the first graphics object and the plurality of second graphics objects are displayed on the display device; and displaying, on the display device, graphics objects assigned to the quad tree structure.

2. The method of claim 1, wherein determining with which of the sub-areas of the display device the first graphics object will visually overlap when the first graphics object is displayed on the display device comprises determining whether the first graphics object would be located in the area of the display corresponding to the node if the first graphics object were displayed.

3. The method of claim 1, wherein determining the node of the quad-tree structure to which the first graphics object belongs comprises:
- determining whether the first graphics object would be located entirely within the sub-area of the display device corresponding to the node if the first graphics object were displayed; and
- determining that the first graphics object belongs to the node of the quad-tree structure when it is determined that the first graphics object would be located entirely within the sub-area of the display device corresponding to the node if the first graphics object were displayed.

4. The method of claim 1, further comprising:
- determining, using one or more processor devices, whether a number of graphics objects belonging to a node meets a threshold;
- when the number of graphics objects belonging to the node meets the threshold:
  - splitting the node into a plurality of further nodes, and
  - for each graphics object belonging to the node, determining, using one or more processor devices, whether the graphics object belongs to one of the further nodes.

5. The method of claim 4, wherein determining whether the first graphics object belongs to the one further node comprises determining whether the first graphics object would be located in a sub-area of the display device corresponding to the one further node if the first graphics object were displayed.

6. The method of claim 5, wherein determining whether the first graphics object belongs to the one further node comprises:
- determining whether the first graphics object would be located entirely within the sub-area of the display device corresponding to the one further node if the first graphics object were displayed; and
- determining that the first graphics object belongs to the one further node when it is determined that the first graphics object would be located entirely within the sub-area of the display device corresponding to the one further node if the first graphics object were displayed.

7. An apparatus, comprising:
- one or more processor devices configured to:
  - assign a plurality of first graphics objects to a quad-tree structure corresponding to a view area of a display device, wherein the quad-tree structure includes a plurality of nodes, wherein at least some of the nodes correspond to respective sub-areas within the view area of the display device,
  - determine with which of the sub-areas of the display device a second graphics object will visually overlap when the second graphics object is displayed on the display device,
  - for each of the sub-areas of the display device with which it is determined the second graphics object will visually overlap, determine whether the second graphics object will visually intersect with any first graphics objects belonging to the corresponding node when the first graphics object and the plurality of second graphics objects are displayed on the display device;
  - when it is determined that the second graphics object will not visually intersect with any of the first graphics objects assigned to the quad tree structure:
    - determine a node of the quad tree structure to which the second graphics object belongs, and
    - assign the second graphics object to the determined node;
  - when it is determined that the second graphics object will visually intersect with at least one of the first graphics objects assigned to the quad tree structure, either:
    - (i) omit the second graphics object from the quad tree structure so that the second graphics object will not be displayed on the display device, or
    - (ii) move a location of the second graphics object so that the second graphics object will not visually intersect with the at least one of the first graphics objects assigned to the quad tree structure when the second graphics object and the plurality of first graphics objects are displayed on the display device; and
  - display, on the display device, graphics objects assigned to the quad tree structure.

8. The apparatus of claim 7, wherein the one or more processor devices are configured to determine with which of the sub-areas of the display device the second first graphics object will visually overlap when the second graphics object is displayed on the display device based on determining whether the second graphics object would be located in the sub-area of the display corresponding to the node if the second graphics object were displayed.

9. The apparatus of claim 7, wherein the one or more processor devices are configured to determine the node of the quad-tree structure to which the second graphics object belongs based on:
- determining whether the second graphics object would be located entirely within the sub-area of the display corresponding to the node if the second graphics object were displayed, and
- determining that the second graphics object belongs to the node of the quad-tree structure when it is determined that the second graphics object would be located entirely within the sub-area of the display corresponding to the node if the second graphics object were displayed.

10. The apparatus of claim 7, wherein the one or more processor devices are configured to:
- determine whether a number of graphics objects belonging to a node meets a threshold,
- when the number of graphics objects belonging to the node meets the threshold:
  - split the node into a plurality of further nodes, and
  - for each graphics object belonging to the node, determine whether the graphics object belongs to one of the further nodes.

11. The apparatus of claim 10, wherein the one or more processor devices are configured to determine whether the graphics object belongs to the one further node based on determining whether the graphics object would be located in a sub-area of the display corresponding to the one further node if the graphics object were displayed.

12. The apparatus of claim 11, wherein the one or more processor devices are configured to determine whether the graphics object belongs to the one further node based on:
- determining, with the one or more processor devices, whether the graphics object would be located entirely within the sub-area of the display corresponding to the one further node if the graphics object were displayed, and
- determining, with the one or more processor devices, that the graphics object belongs to the one further node when it is determined that the graphics object would be located entirely within the sub-area of the display corresponding to the one further node if the graphics object were displayed.

13. A computer-readable memory storing instructions, the instructions when executed by one or more processors cause the one or more processors to:
- assign a plurality of first graphics objects to a quad-tree structure corresponding to a view area of a display device, wherein the quad-tree structure includes a plurality of nodes, wherein at least some of the nodes correspond to respective sub-areas within the view area of the display device,
- determine with which of the sub-areas of the display device a second graphics object will visually overlap when the second graphics object is displayed on the display device, and
- for each of the sub-areas of the display device with which it is determined the second graphics object will visually overlap, determine whether the second graphics object will visually intersect with any first graphics objects belonging to the corresponding node when the first graphics object and the plurality of second graphics objects are displayed on the display device;
- when it is determined that the second graphics object will not visually intersect with any of the first graphics objects assigned to the quad tree structure:
  - determine a node of the quad tree structure to which the second graphics object belongs, and
  - assign the second graphics object to the determined node;
- when it is determined that the second graphics object will visually intersect with at least one of the first graphics objects assigned to the quad tree structure, either:
  - (i) omit the second graphics object from the quad tree structure so that the second graphics object will not be displayed on the display device, or
  - (ii) move a location of the second graphics object so that the second graphics object will not visually intersect with the at least one of the first graphics objects assigned to the quad tree structure when the second graphics object and the plurality of first graphics objects are displayed on the display device; and
- display, on the display device, graphics objects assigned to the quad tree structure.

14. The computer-readable memory storing instructions of claim 13, wherein the instructions, when executed by the one or more processors, cause the one or more processors to determine with which of the sub-areas of the display device the second graphics object will visually overlap when the second graphics object is displayed on the display device based on determining whether the second graphics object would be located in the sub-area of the display corresponding to the node if the second graphics object were displayed.

15. The computer-readable memory storing instructions of claim 13, wherein the instructions, when executed by the one or more processors, cause the one or more processors to determine the node of the quad-tree structure to which the second graphics object belongs based on:
- determining whether the second graphics object would be located entirely within the sub-area of the display corresponding to the node if the second graphics object were displayed, and
- determining that the second graphics object belongs to the node of the quad-tree structure when it is determined that the second graphics object would be located entirely within the sub-area of the display corresponding to the node if the second graphics object were displayed.

16. The computer-readable memory storing instructions of claim 13, wherein the instructions, when executed by the one or more processors, cause the one or more processors to:
- determine whether a number of graphics objects belonging to a node meets a threshold,
- when the number of graphics objects belonging to the node meets the threshold:
  - split the node into a plurality of further nodes, and
  - for each graphics object belonging to the node, determine whether the graphics object belongs to one of the further nodes.

17. The computer-readable memory storing instructions of claim 16, wherein the instructions, when executed by the one or more processors, cause the one or more processors to determine whether the graphics object belongs to the one further node based on determining whether the graphics object would be located in a sub-area of the display corresponding to the one further node if the graphics object were displayed.

* * * * *